United States Patent [19]
Nakauchi et al.

[11] 4,253,741
[45] Mar. 3, 1981

[54] ELECTROCHROMIC DISPLAY DEVICE

[75] Inventors: Hiroshi Nakauchi, Nara; Yasuhiko Inami, Nishinomiya; Kozo Yano, Tenri, all of Japan

[73] Assignee: Sharp Kabushiki Kaisha, Osaka, Japan

[21] Appl. No.: 718,070

[22] Filed: Aug. 26, 1976

[30] Foreign Application Priority Data

Aug. 27, 1975 [JP] Japan .................. 50/104425

[51] Int. Cl.³ ............................... G02F 1/17
[52] U.S. Cl. ................................... 350/357
[58] Field of Search .................. 350/160 R, 357

[56] References Cited

U.S. PATENT DOCUMENTS

3,981,560  9/1976  Heyman et al. ............. 350/160 R

*Primary Examiner*—James W. Davie
*Attorney, Agent, or Firm*—Birch, Stewart, Kolasch & Birch

[57] ABSTRACT

Electrochromic display device employed in a liquid EC system in which an electrode and electrochromic material applied thereon are segmented to define segments corresponding to elements of a displaying pattern and electrode segment portions in excess of the area required to define the displaying pattern are coated with an insulator material, excess area portions of electrochromic material also being similarly coated if necessary, whereby there is reduced build-up of reverse EMF upon activation of the cell and longer color persistence is achieved without use of a complicated drive circuit. To simplify device manufacture for mass-production purposes electrochromic material may be applied in a single layer on an electrode and the display pattern is defined by insulator material applied on selected areas of the electrochromic material.

9 Claims, 6 Drawing Figures

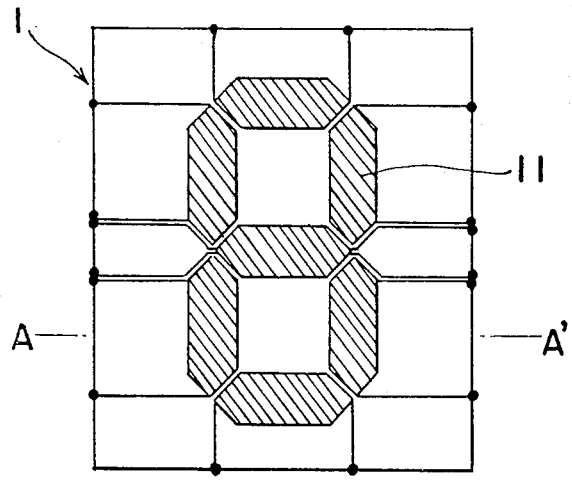
FIG. 1
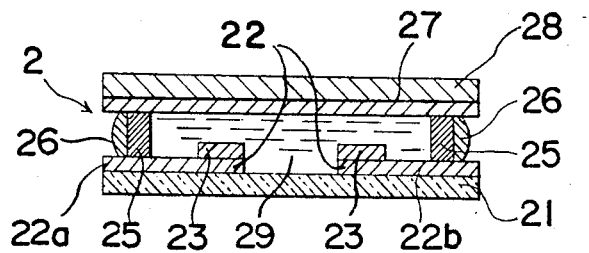
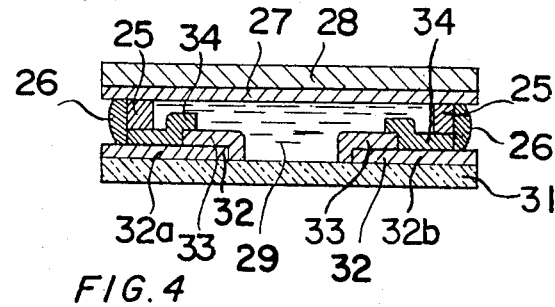
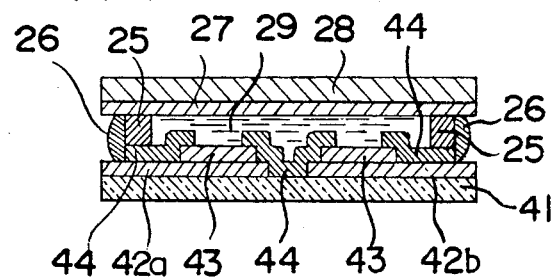
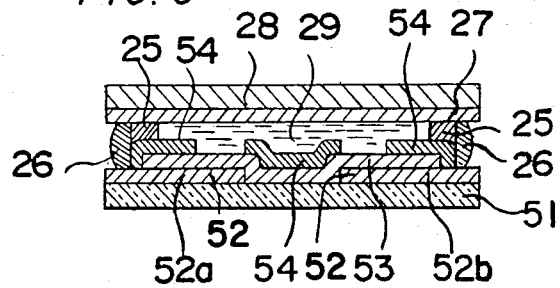
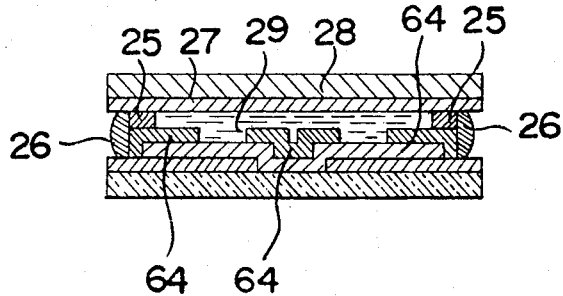

ELECTROCHROMIC DISPLAY DEVICE

The present invention relates to an electrochromic display device. More particularly the invention relates to an electrochromic display device which may remain activated for a period of longer and more constant duration, but which requires only a comparatively simple drive circuit.

A comparatively recent development in display device technology has been to employ a cell or cells of electrochromic material, which is a material in which a normally absent optical absorption band can be introduced, or a normally present optical absorption band can be altered, by application of an electric field or current. A typical example of use of electrochromic cells in a display device is that shown in FIG. 1, in which cells 1 are shown to be arranged in a set array to constitute display segments 11 which are selectively activated in order to define different configurations representing numbers, for example '8' as shown in FIG. 1, or letters, etc. A requirement for the electrochromic process is that there be mixed ionic and electronic conduction, and for this reason favoured materials for display devices are the transition metals or compounds thereof, in particular tungsten trioxide, $WO_3$, which has the advantage that it permits mixed ionic and electronic conduction and good electrochromic performance at room temperature, unlike most other electrochromic materials, which must be heated in order to achieve required display effects. Electrochromic devices may be completely solid state devices or may be part liquid devices, the latter type of device being sometimes referred to as an electrochemichromic device or system. In the current state of the art, the most efficient liquid electrochromic system known is constituted by a cell including electrochromic materials in contact with an electrolyte, such a liquid electrochromic system generally having better efficiency and more clearly defined threshold characteristics than currently known solid-state electrochromic devices.

A typical construction of a conventional liquid electrochromic cell 2 is as shown in FIG. 2 and comprises a transparent substrate 21 which supports on one side thereof a transparent electrode 22, which is constituted by indium oxide, $In_2O_3$, or stannic oxide, $SnO_2$, for example, and is divided into two segments disposed on the left and right portions of the cell 2 as seen in the drawing, the central portion of the transparent substrate 21 thus being uncontacted by electrode material. Needless to say the transparent electrode 22 may be intially applied as a single layer then segmented by an etching processes, or masks may be employed and the electrode 22 deposited directly as separate segments. Each segment of the transparent electrode carries an independent layer 23 of electrochromic material which is normally uncolored, for example the oxide of a transition metal, the electrochromic layers 23 suitably constituting parallel segments of a segmented display device such as shown in FIG. 1. Disposed parallel to the transparent electrode 22 there is a counter electrode 27 which is backed by a support substrate 28 and is separated from the transparent electrode 22 by spacers 25, made of glass, for example, which are provided at opposite ends of the cell 2, the left and right hand ends thereof as seen in FIG. 2. For a front viewing display device the rear portion of the cell 2 is suitably opaque and therefore either the counter electrode 27 or the support substrate 28, or both, may be opaque, or a subsidiary layer of opaque material, not indicated in FIG. 2, may be coated on either the front surface of the counter electrode 27 or rear surface of the support substrate 28. An electrolyte 29 is injected into the space defined between the transparent substrate 21, segments of the transparent electrode 22, electrochromic layers 23, counter electrode 27, and spacers 25, and is sealed in the cell 2 by seal and fixing elements 26 which are provided at the outer surfaces of the spacers 25.

The spacers 25 and seal elements 26 are so positioned that end portions of the transparent electrode 22 and of the counter electrode 27 are contactable at the exterior of the cell 2 and may be connected to a suitable drive circuit, not shown, which serves to activate the electrochromic cell 2 by injection of electrons via one electrode and of positive ions via another electrode. With the construction shown in FIG. 2, drive circuit connections may be such that both segments of the transparent electrode 22 constitute one electrode and the counter-electrode 27 constitutes the other electrode, or that one segment of the transparent electrode 22 constitutes a cathode and the other segment thereof an anode.

Supposing the electrochromic material employed for the layers 23 is tungsten trioxide, $WO_3$, the electrolyte 29 employed may be for example a 1.0 mol/l solution of lithium perchlorate, $LiClO_4$, in Cellosolve acetate, $CH_3COOC_2H_4OC_2H_5$. To give a good background for the electrochormic display the electrolyte 29 is suitably mixed with a finely divided white reflecting powder, for example barium sulfate, $BaSO_4$, in the proportion 1:1 by weight.

With this construction, application of an electrical charge of the order of 1 V to 2 V across the cell 2, with the transparent electrode 22 negative, or one segment of the transparent electrode negative and the other segment thereof positive, the portions of the electrochromic layers 23 in contact with the electrolyte 29 display a blue color in a short time, usually of the order of a fraction of a second. This charge applied by the drive circuit is commonly referred to the 'write' pulse or charge, and the coloration effect can be cancelled and the electrochromic material restored to its uncolored state by a 'bleaching' or 'erasure' pulse or charge, which is a charge of equal value but opposite polarity to the write charge.

Although there are various other postulated factors which contribute to the coloration effect, this effect may be considered to be principally due to a redox reaction. When $WO_3$ is employed as the electrochromic material if the electrolyte is an anhydrous medium constituted by lithium perchlorate, $LiClO_4$, in a supporting electrolyte the reaction producing the coloration effect and erasure effect is generally considered to be

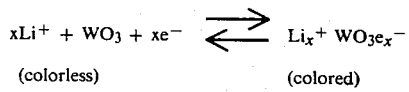

$$xLi^+ + WO_3 + xe^- \rightleftharpoons Li_x^+ WO_3e_x^-$$
(colorless) (colored)

Using $WO_3$ and a hydrous electrolyte the reaction is thought to be

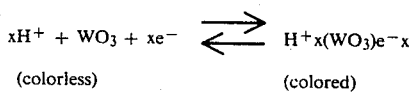

$$xH^+ + WO_3 + xe^- \rightleftharpoons H^+_x(WO_3)e^-_x$$
(colorless) (colored)

In the electrochromic cell of the above-described structure there is a problem that a galvanic cell is formed at the interfacial surface since the transparent electrode 22 and the electrochromic layer 23 are in contact with the same electrolyte 29. This results in that the duration of retaining the display is extremely reduced due to spontaneous discharge of the internal galvanic cell. To solve this problem through the use of circuit technique, it is necessary always to apply voltage equal to the internal cell voltage across the electrochromic display cell. Such a drive system still requires a supplementary power supply and of course demands a more complex circuit, which is undesirable in a display device requiring inclusion of a plurality of electrochromic cells. Furthermore, in such devices, since successive application of negative and positive potentials at electrodes results in gradual dissolution of the electrodes in the electrolyte, accompanied or unaccompanied by reduction of the electrodes, and since the devices are essentially small devices and the electrodes are normally constituted by thin layers of suitable conductive materials, the electrodes are, for practical purposes, completely dissolved after the device has been in series, i.e., has been repeatedly written and erased, for a comparatively short time only. This is of course a disadvantage when the device is used as a single unit, and is a particular disadvantage when the device is used in combination with other devices in a segmented display such as shown in FIG. 1, since for practical reasons it is standard maintenance procedure to replace the entire display if one element thereof fails.

It is accordingly a principal object of the invention to provide an electrochromic device in which dissolution of electrodes is prevented, whereby more reliable and longer service is achieved.

It is another object of the invention to provide an electrochromic device permitting improved but simplified control of color persistence.

It is a further object of the invention to provide an electrochromic device which permits improved control of color persistence and is suited to manufacture on a mass-production basis.

In accomplishing these and other objects there is provided according to the invention an electrochromic device wherein electrochromic material is applied on a transparent electrode and those portions of the transparent electrode which do not carry electrochromic material have applied thereon a thin layer of insulatory material, whereby the area of interface with an electrolyte is reduced, and there is corresponding reduction of reverse electromotive force which may be built up during activation of the electrochromic device. In other embodiments of the invention, a layer of electrochromic material is applied over almost the whole area of a transparent electrode and areas of electrochromic material required to serve as display elements are defined by insulator material applied over selected portions of the electrochromic material.

A better understanding of the present invention may be had from the following full description of several preferred embodiments thereof, when read in reference to the attached drawings, in which like unit-value numbers of reference numbers indicate like parts, each of the drawings FIG. 2 through FIG. 6 is a cross-sectional view taken through the line A—A of FIG. 1, and FIG. 1 is a plane view showing an example of an electrochromic segment display device;

FIG. 2 is a cross-sectional view of a conventional photochromic device referred to in the above description;

FIG. 3 is a cross-sectional view of an electrochromic device according to one embodiment of the invention;

FIG. 4 is a cross-sectional view of a modification of the device of FIG. 3;

FIG. 5 is a cross-sectional view of an electrochromic device according to another embodiment of the invention; and FIG. 6 is a modification of the device of FIG. 5.

Referring to FIG. 3, according to a first embodiment of the invention a transparent electrode 32 constituted by indium oxide, $In_2O_3$, or stannic oxide, $SnO_2$, for example, is formed by evaporation or application printing process on a transparent substrate 31 constituted by glass or transparent plastic plate or by a film of transparent resin for example, and is divided into segments 32a and 32b by etching or other known process. An electrochromic layer 33 having a thickness of the order of 0.5 to 1 $\mu$m and constituted by tungsten trioxide, $WO_3$, or the oxide of another transition metal is evaporated onto each segment 32a and 32b. Each electrochromic layer 33 should completely cover the edge portion of the corresponding etched segment 32a or 32b, this being easily achieved by applying the electrochromic layers 33 through a mask defining openings which, regarding the right-hand and left-hand ends of the electrode 32 as seen in the drawing as the outer ends thereof, extend slightly inwardly of the edge portions of the electrode segments 32a and 32b by a distance approximately equal to the thickness of the electrode 33, i.e., 0.5–1 $\mu$m.

To prevent coloration of portions of the electrochromic layers other than those in which coloration is required to be effected for display purposes, and also to prevent color from appearing at the central area portions of the electrode segments 32a and 32b and to avoid the possibility of these areas of the electrode segments from effectively constituting elements of a reverse EMF cell produced upon activation of the electrochromic device, insulator films 34 are applied on the outer end portions of the electrochromic layers 33 and on the central area portions of the electrode segments 32a and 32b, only outer end portions of the segments 32a and 32b being left uncovered in order to permit connection to an external drive circuit. The insulator material employed for the layers 34 should of course be unreactive with the electrolyte 29 employed and is suitably an inorganic substance such as silicon oxide, $SiO_2$ or $SiO$, or aluminum oxide, $Al_2O_3$, or an organic substance such as epoxy resin, photoresist material such as material known under the trade-name of KMER, KTFR, OMR, or Waycoat, or a plastic paint.

In a generally parallel relationship to the transparent electrode 32 there is provided a counter electrode 27 which is mounted on a rear support substrate 28. The support substrate 28 is suitably constituted by a sheet of stainless steel or, like the transparent substrate 31, by a sheet of glass or transparent plastic or transparent resin film. If the support substrate 28 is a sheet of glass or transparent plastic or a transparent resin film, the counter electrode 27 is suitably a transparent indium oxide, $In_2O_3$, or stannic oxide, $SnO_2$, electrode formed on the support substrate 28, whereas if the support substrate 28 is a sheet of stainless steel the counter electrode 27 may be a carbon electrode formed on the support substrate 28.

The counter electrode 27 and transparent electrode 32 are held in place and separated by a distance of from 10 μm to 1 mm by spacers 25 which are constituted by teflon, polyester, mylar, or glass sheets, the spacers 25 together with the substrates 31 and 28 and electrodes 32 and 27 being fixedly held in position by fixing and sealing elements 26 made of epoxy resin, photo-hardening resin or low melting point glass, for example.

The electrolyte 29 employed should of course be chemically stable with respect to the material of the electrochromic layers 33, the insulator layers 34, the fixing and sealing layers 26, and may suitably comprise acetonitrile, $CH_3CN$, as solvent, and lithium perchlorate, $LiClO_4$, added to the proportion of 1 mol per liter of supporting electrolyte. Alternatively, use of propylene carbide as the solvent is advantageous since it permits operation of the display device over a wider temperature range. In addition to these organic solvents these may be advantageously employed a solvent which is a mixture of glyceral, $C_3H_8O_3$, and a saturated solution of tungsten trioxide, $WO_3$, in 2-normal sulfuric acid. If the counter electrode is formed on a sheet of stainless steel there is suitably mixed in the electrolyte a light-dispersion agent such as titanium dioxide, in order to provide a white background giving improved contrast for viewing a display.

With this construction, those internal portions of the electrochromic device, which in effect constitute plates of a cell which is charged with a reverse electromotive force, have a smaller area and the capacity of this reverse EMF cell is therefore smaller, there is less charge tending to cancel a write pulse, and hence increased persistence of color is provided once a write pulse has been applied.

As well as giving increased color persistence in response to single pulse activation, the insulator layers 34 also contribute greatly to improved reliability of an electrochromic device. This was made clear from tests conducted simultaneously on electrochromic devices constructed according to the invention and conventional devices. The material of the transparent electrodes of both types of device was $In_2O_3$, electrode extension or lead-out portions were coated with a 3,500 Å thick layer in the means of the invention and were bare in the conventional means, the electrolyte employed in all the devices was a 1.0 mol/l solution of lithium perchlorate, $LiClO_4$, in Cellosolve acetate, $CH_3COOC_2H_4OC_2H_5$, mixed with a 1:1 by weight addition of barium sulfate, $BaSO_4$, three-terminal drive was employed, and the test was an on-off life test in which for each device tested a write pulse of 1.5 V was applied for 0.5 seconds, the device was left without application of charge for 0.5 seconds, and an erasure pulse was applied for 1 second, this 2-second cycle being constantly repeated. With conventional means it was found that within one hour exposed electrode portions became discolored brown and activation of the devices was no longer possible. Further tests and examination showed that this was due to the fact that when subjected to a negative potential $In_2O_3$ in reduced by and dissolved in the electrolyte to such an extent that the $In_2O_3$ layer is no longer able to function as an electrode, with the result that current can no longer be passed through the electrolyte. When positively charged also, although it is not reduced, the $In_2O_3$ layer is dissolved, leading to the same results. With the means of the invention however this effect is eliminated and continued switching of the display device is therefore possible.

Similar tests were conducted on display devices having $SnO_2$ electrodes and employing a mixture of $H_2SO_4$, glycerol and $TiO_2$ as electrolyte. The on-off switching cycle was a 2-second cycle as before but a two-terminal drive circuit was employed and the write and erase pulses were 2 V. In these tests also, whereas display devices not having electrodes protected by insulator layers became impossible to activate within a period of 1-2 hours, display devices according to the invention were unaffected.

FIG. 4 shows a modification of the means of FIG. 3 wherein etched edge portions of electrode segments 42a and 42b are covered by a centrally applied layer 44 of insulator material rather than by material of the electrochromic layers 43. The centrally applied insulator layer 44 also covers inner end portions of the electrochromic layers which are not required for display purposes, the coloration area of the electrochromic layers 43 in this modification being somewhat smaller than that of the electrochromic layers 23 in the embodiment of FIG. 2.

In another embodiment of the invention shown in FIG. 5, a single layer 53 of electrochromic material is spread across the entire central portion of the transparent electrode 52 and the required display areas of the electrochromic layer 53 are defined by a centrally applied and outer end insulator layers 54. In the example shown in FIG. 5, the insulator layers 54 were produced from a single insulator layer which was applied over the whole surface of the electrochromic layer 53 and then etched to give separate insulator layers 54 of the required dimensions.

FIG. 6 shows a modification of the means of FIG. 5 in which the insulator layers 64 are applied directly through masks and create overlapping areas with the electrode.

The means of FIGS. 5 and 6 are particularly advantageous for mass-manufacture purposes since the electrochromic layer may be applied directly, there is greater allowance in relative positioning of the electrochromic layer and the transparent electrode segments and highly precise art-work is demanded only in formation of the insulator layers, which, as is known, present less art-work problems than other types of material.

Needless to say, the same advantages are achieved if in the means of the invention shown in FIGS. 4, 5, and 6 the transparent electrode is a single electrode rather than segments, and for all the means of the invention shown in FIGS. 3, 4, 5, and 6 if electrodes themselves constitute substrates, of if display segments are employed in display of letters of the alphabet, or special signs, etc., instead of in a numerical display as described above.

What is claimed is:

1. In an electronic display device having a first substrate and counter electrode, a second substrate and segmented display electrodes facing said counter electrode, spacer means separating said substrates and defining therewith a cavity, an electrolyte filling said cavity between and overlying said electrodes in a display area defined by the boundaries of said cavity within said spacer means; the improvement comprising:

a continuous layer of electrochromic material overlying said entire display area and said segmented electrodes between the latter and said electrolyte; and an insulating layer overlying portions of said electrochromic layer, the remaining portions of said electrochromic layer not covered by said insulating layer defining discrete display segments on related portions of said electrochromic layer in registry with said segmented electrodes.

2. The invention of claim 1, wherein said insulating layer comprises organic insulating material surrounding discrete areas on said continuous layer of electrochromic material, said discrete areas comprising said discrete display segments on said segmented electrodes.

3. The invention of claim 1, wherein said insulating layer comprises inorganic insulating material surrounding discrete areas on said continuous layer of electrochromic material, said discrete areas comprising said discrete display segments on said segmented electrodes.

4. The invention defined in claim 1 which further includes means precluding adjacent edge portions of said segmented electrodes and said electrochromic layer from mutually contacting said electrolyte.

5. The invention defined in claim 2 which further includes means precluding adjacent edge portions of said segmented electrodes and said electrochromic layer from mutually contacting said electrolyte.

6. The invention defined in claim 3 which further includes means precluding adjacent edge portions of said segmented electrodes and said electrochromic layer from mutually contacting said electrolyte.

7. In an electrochromic display device having a first substrate and counter electrode, a second substrate and segmented display electrodes facing said counter electrode, spacer means separating said substrates and defining therewith a cavity, electrolyte filling said cavity between and overlying said electrodes in a display area defined by the boundaries of said cavity within said spacer means; the improvement comprising:
  a layer of electrochromic material overlying a portion of each said segmented electrodes inboard of said spacer means in said display cavity and precluding contact between said electrolyte and the innermost edge portions of said segmented electrodes by overlying said edge portions; and
  an insulating layer defining an outermost operative portion of the electrochromic layer, said outermost operative portion defining a discrete outer boundary of a display segment, the inner boundary of said display segment being defined by portions of said electrochromic layer overlying said innermost edge portions of said display electrodes;
  said insulating layer mutually overlying said electrochromic layer and said segmented electrode between said spacer and said outer boundary of said display segment to isolate them from said electrolyte.

8. In an electrochromic display device having a first substrate and counter electrode, a second substrate and segmented display electrodes facing said counter electrode, spacer means separating said substrates and defining therewith a cavity, electrolyte filling said cavity between and overlying said electrodes in a display area defined by the boundaries of said cavity within said spacer means; the improvement comprising:
  a layer of electrochromic material overlying a portion of each said segmented electrodes inboard of said spacer means in said display cavity and precluding contact between said electrolyte and the innermost edge portions of said segmented electrodes by overlying said edge portions; and
  an insulating layer defining an outermost operative portion of the electrochromic layer, said outermost operative portion defining a discrete outer boundary of a display segment, the inner boundary of said display segment being defined by portions of said electrochromic layer overlying said innermost edge portions of said display electrodes.

9. In an electrochromic display device comprising a transparent substrate, a transparent electrode deposited on said substrate a layer of electrochromic material deposited over and extending beyond said electrode, a counter-electrode positioned in spaced relationship with said substrate, and electrolyte material between the electrochromic layer and said counter-electrode, the improvement comprising:
  an insulating layer deposited on said electrochromic layer and containing an opening, said opening being in spaced alignment with said electrode and laterally inward of the electrode edges, said insulating layer covering said electrochromic layer except that portion which is directly under said opening.

* * * * *